US008825279B2

(12) United States Patent
Kitamura et al.

(10) Patent No.: US 8,825,279 B2
(45) Date of Patent: Sep. 2, 2014

(54) BICYCLE POWER SENSING APPARATUS

(75) Inventors: Satoshi Kitamura, Osaka (JP);
Michihiro Kodama, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/609,974

(22) Filed: Sep. 11, 2012

(65) Prior Publication Data

US 2014/0074348 A1 Mar. 13, 2014

(51) Int. Cl.
*G01M 17/00* (2006.01)
*G06F 7/00* (2006.01)
*G01L 5/12* (2006.01)

(52) U.S. Cl.
USPC .......................... 701/33.1; 701/36; 73/862.49

(58) Field of Classification Search
USPC .......................... 701/33, 36, 33.1; 73/862.49
See application file for complete search history.

(56) References Cited

U.S. PATENT DOCUMENTS

| 496,639 | A | 5/1893 | Clawson |
| 5,027,303 | A | 6/1991 | Witte |
| 5,031,455 | A | 7/1991 | Cline |
| 6,418,797 | B1 | 7/2002 | Ambrosina et al. |
| 6,924,569 | B2 | 8/2005 | Endo et al. |
| 7,418,875 | B2 | 9/2008 | Kohno et al. |
| 7,516,677 | B2 | 4/2009 | Watarai et al. |
| 7,814,800 | B2 | 10/2010 | Roovers et al. |
| 7,861,599 | B2 * | 1/2011 | Meggiolan ........................ 73/794 |
| 8,117,923 | B2 * | 2/2012 | Sasaki .......................... 73/862.49 |
| 8,370,087 | B2 * | 2/2013 | Zhu et al. ........................ 702/44 |
| 2005/0178210 | A1 | 8/2005 | Lanham |
| 2005/0275561 | A1 | 12/2005 | Kolda et al. |
| 2007/0068273 | A1 | 3/2007 | Cunningham |
| 2009/0120208 | A1 | 5/2009 | Meyer |
| 2009/0319203 | A1 | 12/2009 | Kalliomaki et al. |
| 2010/0264622 | A1 | 10/2010 | Bastianen |
| 2011/0006760 | A1 | 1/2011 | Glueck et al. |
| 2012/0166105 | A1 * | 6/2012 | Biermann et al. ............... 702/43 |
| 2012/0303195 | A1 * | 11/2012 | Boyle .............................. 701/22 |

FOREIGN PATENT DOCUMENTS

| DE | 600 32 819 T2 | 11/2007 |
| DE | 10 2010 039 852 A1 | 3/2012 |
| GB | 2 456 821 A | 7/2009 |
| JP | 2009-006991 A | 1/2009 |
| WO | 2009/041820 A1 | 4/2009 |
| WO | 2011030215 A1 | 3/2011 |

OTHER PUBLICATIONS

SRM; Trainings system, Wireless + Power Control 7; Aug. 2, 2010.

* cited by examiner

*Primary Examiner* — Thomas G Black
*Assistant Examiner* — Tyler Paige
(74) *Attorney, Agent, or Firm* — Global IP Counselors

(57) ABSTRACT

A bicycle power sensing apparatus is basically provided with a power sensing device, a calibration signal generating device and a controller. The controller is operatively arranged to receive a calibration signal from the calibration signal generating device. The controller calibrates the power sensing device upon receiving the calibration signal.

19 Claims, 15 Drawing Sheets

BICYCLE POWER SENSING APPARATUS

BACKGROUND

1. Field of the Invention

This invention generally relates to a bicycle power sensing apparatus. More specifically, the present invention relates to a bicycle power sensing apparatus that measures a force acting on a part of a bicycle for indicating a pedaling power of a rider.

2. Background Information

Recently, some bicycles are provided with cycle computers for providing information (e.g., operating conditions, rider performance, etc.) to the rider. Also some bicycles are provided with electronic bicycle components for assisting the rider in operating the bicycle or for adjusting an operating condition of the bicycle to improve the comfort or performance of the bicycle. Information on various operating conditions and rider performance are often used by electronic bicycle components that are adjusted based on the bicycle operating conditions. One particularly useful piece of information is the power exerted by the rider on the bicycle components due to the pedaling force applied by the rider.

One example of a bicycle power sensing apparatus is disclosed in the U.S. Pat. No. 7,861,599. In this patent, the bicycle power sensing apparatus measures a power exerted to rotate a bicycle wheel, a crank, or other rotating part. The bicycle power sensing apparatus is basically provided with a cadence sensor, a strain gauge, an amplifier, an A/D converter, a processor and a wireless transmitter. The cadence sensor measures cadence (the rotational speed of the crank). The strain gauge measures a strain of the crank shaft occurring when a rider is pedaling. The amplifier amplifies an analog electric signal outputted from the strain gauge to a range that can be processed by the A/D converter. The A/D converter circuit converts the amplified analog electric signal to a digital signal. The processor calculates a torque acting on the crank shaft based on this digital electric signal. The processor calculates a power imparted by the rider based on this torque and the cadence outputted from the cadence sensor. The wireless transmitter transmits the power or torque calculated by the processor to a cycling computer.

SUMMARY

Generally, the present disclosure is directed to various features of a bicycle power sensing apparatus that measures a force acting on a part of a bicycle for indicating a pedaling power of a rider. In one feature, the bicycle power sensing apparatus is provided a calibration feature.

Accordingly, one aspect presented in this disclosure is to provide a bicycle power sensing apparatus that has a power sensing device having a calibration feature.

In view of the state of the known technology, a bicycle power sensing apparatus is provided that basically comprises a power sensing device, a calibration signal generating device and a controller. The controller is operatively arranged to receive a calibration signal from the calibration signal generating device. The controller calibrates the power sensing device upon receiving the calibration signal.

Other objects, features, aspects and advantages of the disclosed bicycle power sensing apparatus will become apparent to those skilled in the art from the following detailed description, which, taken in conjunction with the annexed drawings, discloses preferred embodiments of the bicycle power sensing apparatus

BRIEF DESCRIPTION OF THE DRAWINGS

Referring now to the attached drawings which form a part of original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
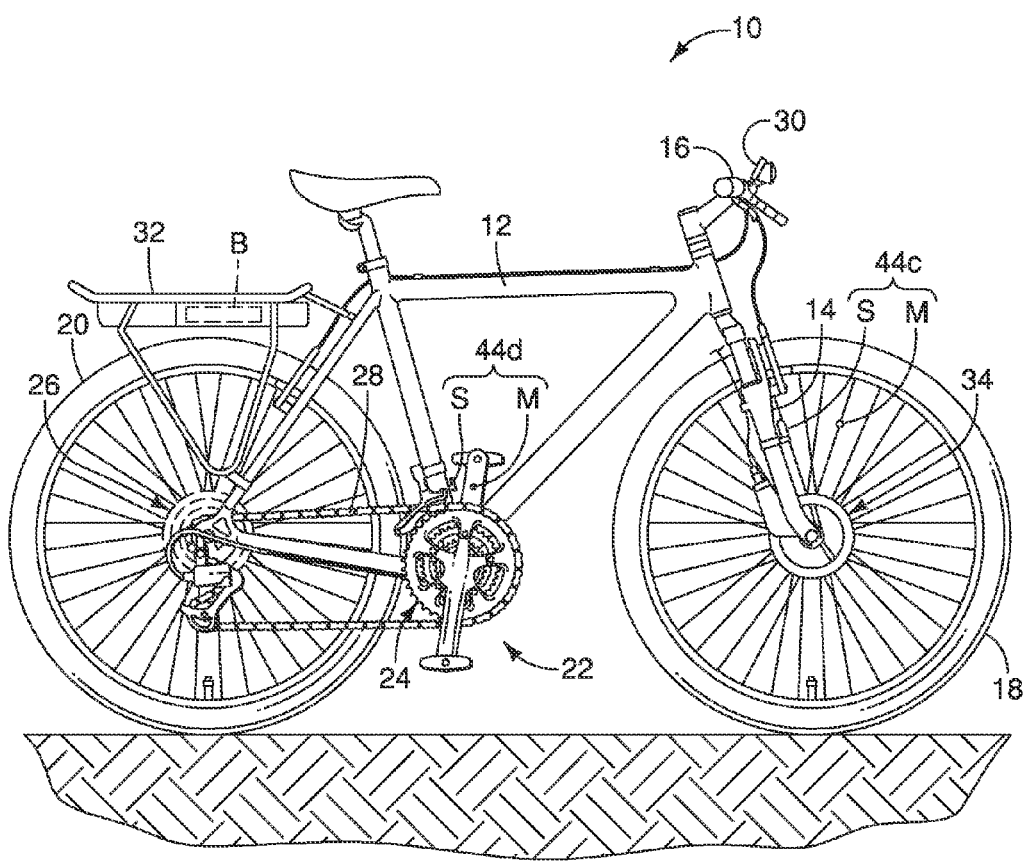
FIG. 1 is a side elevational view of a bicycle that is equipped with a bicycle power sensing apparatus in accordance with various illustrative embodiments.

Referring initially to FIG. 1, a bicycle 10 is illustrated that is equipped with a bicycle power sensing apparatus in accordance with various illustrative embodiments. Basically, the bicycle 10 includes a bicycle frame 12, a front fork 14, a handlebar 16, a front wheel 18, a rear wheel 20 and a drive train 22. The front fork 14 is attached to a frontward portion of the frame 12 such that the front fork 14 can pivot about a slanted axis. The handlebar 16 is fixedly attached to a steerer tube of the front fork 14 in a conventional manner, while the front wheel 18 is attached to a lower end of the front fork 14 in a conventional manner. The rear wheel 20 is attached to a rear end of the frame 12. The drive train 22 basically includes a front crankset 24, a rear gear cassette 26 and a chain 28. The chain 28 is disposed on the front crankset 24 and a rear gear cassette 26 in a conventional manner such that the rear wheel 20 rotates relative to the frame 12 by a pedaling action of a rider.

In FIG. 1, the bicycle 10 is provided with a cycling computer 30 that is mounted on the handlebar 16. The cycling computer 30 provides information or data (e.g., operating conditions, rider performance, speed of the bicycle 10, the crank rotation (cadence) and distance traveled, etc.) to the rider. The bicycle 10 has a plurality of electronic bicycle components, and thus, the bicycle 10 is illustrated as including a battery unit 32 and a front hub dynamo 34 for supplying electrical energy to the various electrical bicycle components and/or for charging a battery B of the battery unit 32.

Of course, the bicycle 10 also preferably further includes various conventional components or parts, such as a saddle, a pair of brake devices, a pair of shifters, a pair of derailleurs, etc. These conventional components or parts of the bicycle 10 will not be discussed or illustrated in detail herein. It will be apparent to those skilled in the bicycle art from this disclosure that various modifications can be made to the various conventional components or parts of the bicycle 10 without departing from the scope of the present invention.

Figure 2:
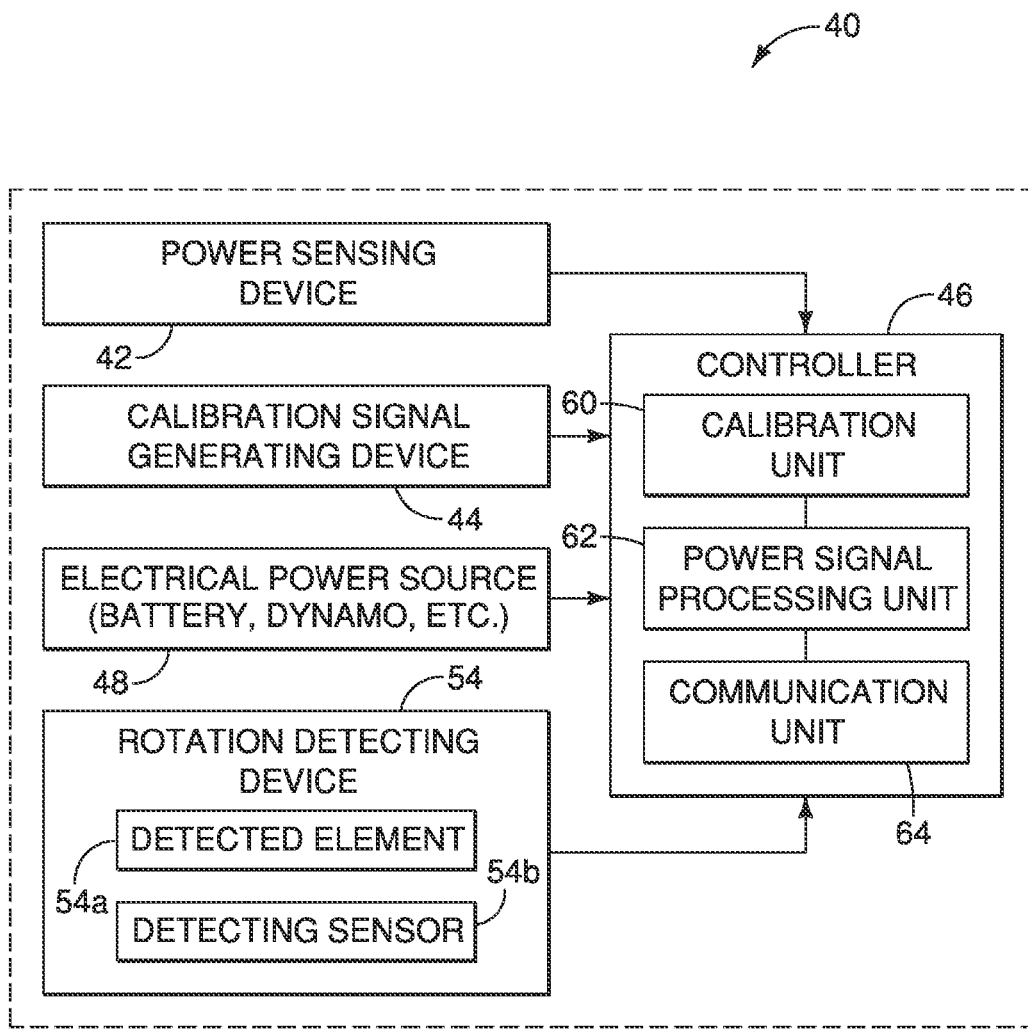
FIG. 2 is a schematic block diagram showing an overall configuration of the bicycle power sensing apparatus.

Referring now to FIG. 2, a bicycle power sensing apparatus 40 is diagrammatically illustrated, which can be installed on various components of the bicycle 10 that receive a torque from the rider's pedaling action. The bicycle power sensing apparatus 40 basically comprises a power sensing device 42, a calibration signal generating device 44 and a controller 46. An electrical power source 48 is provided for supplying electrical energy to the controller 46. The electrical power source 48 can be directly or indirectly connected to the controller 46. The electrical power source 48 can also supply electrical energy to the power sensing device 42 and the calibration signal generating device 44, if needed. The electrical power source 48 can be the front hub dynamo 34, which is electrically coupled to the controller 46 to supply electrical energy to the controller 46.

The power sensing device 42 is able to measure the driving force of a rider, which is processed by the controller 46. The controller 46 transmits information related to the driving force measured by the power sensing device 42 to the rider. The information related to the driving force which is transmitted is displayed on, for example, the cycling computer 30, which is mounted on the handlebar 16 of the bicycle 10. Here, in the cycling computer 30, information such as the speed of the bicycle, the rotation speed of a crank (cadence), the distance travelled, and the like is also displayed to the rider as mentioned above.

Basically, the controller 46 is further operatively arranged to receive a calibration signal from the calibration signal generating device 44, which starts the execution of the calibration process of the controller 46. One example of the calibration process execute by the controller 46 is illustrated by the flow chart of FIG. 3.

In the first illustrated embodiment, once the controller 46 receives the calibration signal from the calibration signal generating device 44, in step S1, the controller 46 determines a rotational status of a selected component of the drive train 22. If the selected component of the drive train 22 is not rotating, then the controller 46 proceeds to step S2. In step S2, the controller 46 calibrates the power sensing device 42 by recording a power output signal level, which is currently being detected, as a zero "0" power level (e.g., zero force or torque). Thus, the power sensing device 42 is now calibrated and the calibration process ends.

In step S1, if the controller 46 determines that the selected component of the drive train 22 is rotating, then the controller 46 proceeds to step S3. In step S3, the controller 46 set a timer for rechecking the rotational status of the selected component of the drive train 22. Thus, in step S4, the controller 46 determines if a predetermined time, which was set in step S3, has elapsed. Once the predetermined time has elapsed, the calibration process proceeds to step S1, where the controller 46 again determines the rotational status of the selected component of the drive train 22. The controller 46 will continue to check the rotational status of the selected component of the drive train 22 until the user operates a setting button on the cycling computer 30 or some other predetermined condition occurs such as a shifting operation, a bicycle speed reaching a prescribed speed, etc. In other words, the program loop of step S4 can be canceled either by the user or upon a predetermined condition occurring.

Figure 4:
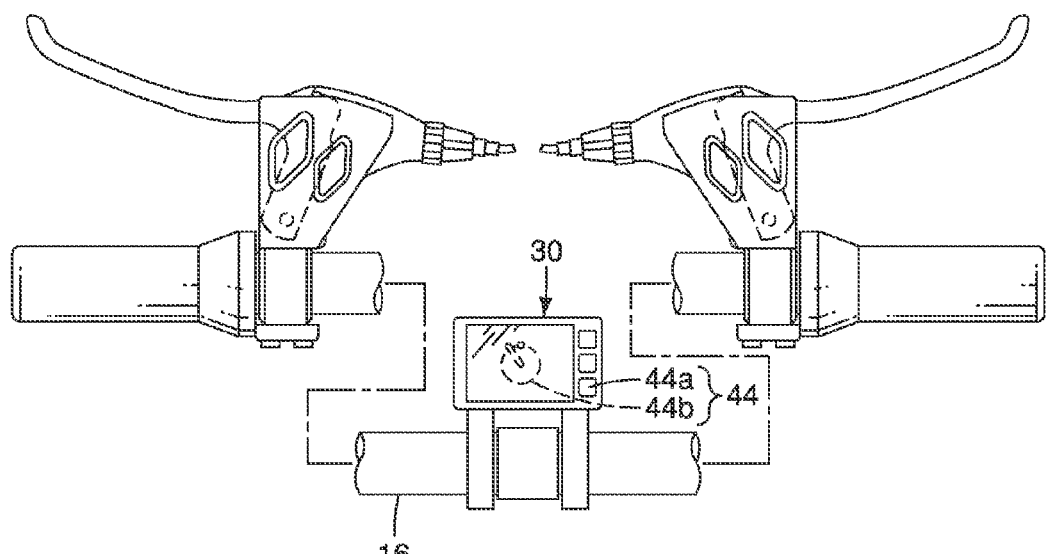
FIG. 4 is an enlarged perspective view of the handlebar equipped with a cycle computer and a pair of input devices.

The calibration signal generating device 44 can be either wirelessly connected to the controller 46 or connected to the controller 46 by an electrical wire. The calibration signal generating device 44 can be, for example, one or more of the following devices: a manually operated input device (e.g., a switch), a timer, a bicycle speed generating device (e.g., a speed sensor), a bicycle crank rotation detecting device (e.g., a cadence sensor). In the first illustrated embodiment, the calibration signal generating device 44 includes a plurality of calibration signal generating devices 44a, 44b, 44c and 44d that are operatively connected to the cycling computer 30, as seen in FIGS. 1 and 4. Thus, in the first illustrated embodiment, the cycling computer 30 can be operated to allow the rider or other user to select different ways to generate a calibration signal, which is outputted to the controller 46.

In particular, as seen in FIG. 4, in the first illustrated embodiment, the calibration signal generating device 44a is a manually operated input device (e.g., a push button type switch) for manually generating a calibration signal, and the calibration signal generating device 44b is a timer (e.g., a timing circuit) for automatically generating a calibration signal at a predetermined time of day, on a predetermined day of week, in a predetermined month, in predetermined years, or at a predetermined interval. While the calibration signal generating devices 44a and 44b are illustrated as being integrated with the cycling computer 30, it will be apparent to those skilled in the bicycle art from this disclosure that an input device constituting the calibration signal generating device can be disposed either near the power sensing device 42 or mounted directly on the handlebar 16 as shown.

As seen in FIG. 1, in the first illustrated embodiment, the calibration signal generating device 44c is a bicycle speed detecting device (e.g., a speed sensor) for automatically generating a calibration signal upon detecting that the bicycle 10 has stopped moving for a predetermined amount of time. In the illustrated example, the calibration signal generating device 44c (i.e., the bicycle speed detecting device) is formed by a sensor S (e.g., a reed switch or a Hall Effect sensor) mounted to the front fork 14 and a magnet M mounted to a spoke of the front wheel 18. The calibration signal generating device 44d is a bicycle crank rotation detecting device (e.g., a cadence sensor) for automatically generating a calibration signal upon detecting that the bicycle 10 has stopped moving for a predetermined amount of time. In the illustrated example, the calibration signal generating device 44d (i.e., the bicycle crank rotation detecting device) is formed by a sensor S (e.g., a reed switch or a Hall Effect sensor) mounted to the bicycle frame 12 and a magnet M mounted to a crank arm of the front crankset 24.

As explained below, the power sensing device 42 can be disposed on one or more of the various components of the bicycle 10 as needed and/or desired. For example, some preferably areas for installing the power sensing device 42 include, but not limited to, the rear wheel 20, the front crankset 24 (e.g., on the crank arm, the crank axle or the crank spider), a portion of a bottom bracket (e.g., on the bottom bracket adapter, inside of a bicycle hanger) of the bicycle frame 12, a frame end portion of the bicycle frame 12, and the chain 28.

In any case, the controller 46 calibrates the power sensing device 42 upon receiving the calibration signal from the calibration signal generating device 44 (i.e., one of the calibration signal generating device 44a, 44b, 44c and 44d). To calibrate the power sensing device 42, the controller 46 set a current detected signal from the power sensing device 42 to a known reference power value (e.g., 0) that corresponds to a current operating (power sensing) condition of the power sensing device 42. For simplicity, the controller 46 calibrates the power sensing device 42 at anon-load level (i.e., a zero power input condition) of the power sensing device 42. More specifically, the controller 46 calibrates a signal received from the power sensing device 42 as non-load level for the signal received at the time of calibration of the power sensing device 42. Preferably, the controller 46 records a signal level of an output signal from the power sensing device 42 as a non-load level while detecting relative rotation between the drive member and the driven member.

In order to determine that the power sensing device 42 is in anon-load level (i.e., a zero power input condition), the bicycle power sensing apparatus 40 is provided with a rotation detecting device 54, which is one example of a device that sensing when the power sensing device 42 is in a zero power input condition. Basically, as mentioned above, the controller 46 calibrates the power sensing device 42 while the rotation detecting device 54 detects relative rotation between a drive member and a driven member of a bicycle component that receives a driving torque as a result of a rider's pedal force. If the rotation detecting device 54 indicates that no relative rotation is occurring between the drive member and the driven member, then the controller 46 waits to check the rotational movement signal from the rotation detecting device 54 until after a prescribed period of time has elapsed since the controller 54 had previously determined no relative rotation between the drive member and the driven member.

Basically, the rotation detecting device 54 preferably includes a detected element 54a and a detecting sensor 54b. The detected element 54a is disposed on a first part, while the detecting sensor 54b is disposed on a second part, which rotates relative to the first part. The detecting sensor 54b is configured to detect the presence of the detected element 54a upon the detected element 54a and the detecting sensor 54b being disposed adjacent one another. The detected element 54a can be, for example, one or more magnets. The detecting sensor 54b can be, for example, a reed switch or a Hall Effect device that can detect the presence of the magnets when they are within a prescribed range. Alternatively, the detected element 54a can be, for example, a member having one or more openings and the detecting sensor 54b can be, for example, an optical sensor that detects the opening(s) of the detected element 54a. The detecting sensor 54b is electrically connected to the controller 46 by an electrical wire (not shown) for outputting a detection signals to the controller 46.

The controller 46 is preferably a micro-computer that that includes conventional components such as an input interface circuit, an output interface circuit, and storage devices such as a ROM (Read Only Memory) device and a RAM (Random Access Memory) device. The micro-computer of the controller 46 is programmed to process signals from the power sensing device 42, the calibration signal generating device 44 and the rotation detecting device 54. The memory circuit stores processing results and control programs such as ones for carrying out the calibration process and the power level sensing process that are run by the processor circuit. The internal RAM of the controller 46 stores statuses of operational flags and various control data. The internal ROM of the controller 46 stores the programs for various operations.

Figure 3:
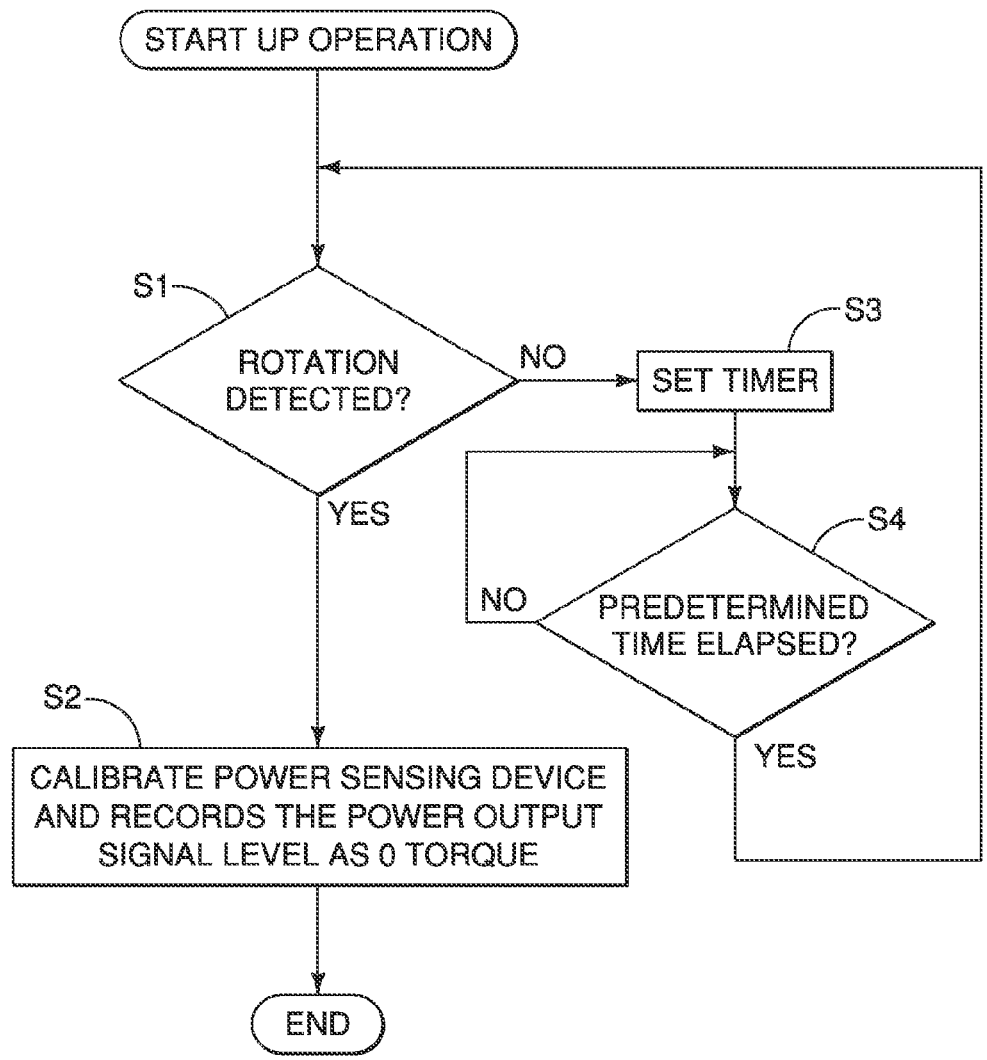
FIG. 3 is a flowchart showing a control processing executed by the controller of bicycle power sensing apparatus to calibrate the rotation detecting device.

As seen in FIG. 2, the controller 46 includes a calibration unit 60 that executes the calibration process of the flow chart illustrated in FIG. 3 for calibrating the power sensing device 42 in response to an input signal from the calibration signal generating device 44. The controller 46 further includes a power signal processing unit 62 that receives and processes the power signals from the power sensing device 42. Preferably, the controller 46 further includes a communication unit 64, which in the first embodiment of FIGS. 1 to 12 is a wireless communication unit. The communication unit 64 is operatively connected to the power sensing device 42 to receive an output signal from the power sensing device 42 and outputs information based on the output signal from the power sensing device 42. The communication unit 64 receives a calibration signal from the calibration signal generating device 44.

Figure 5:
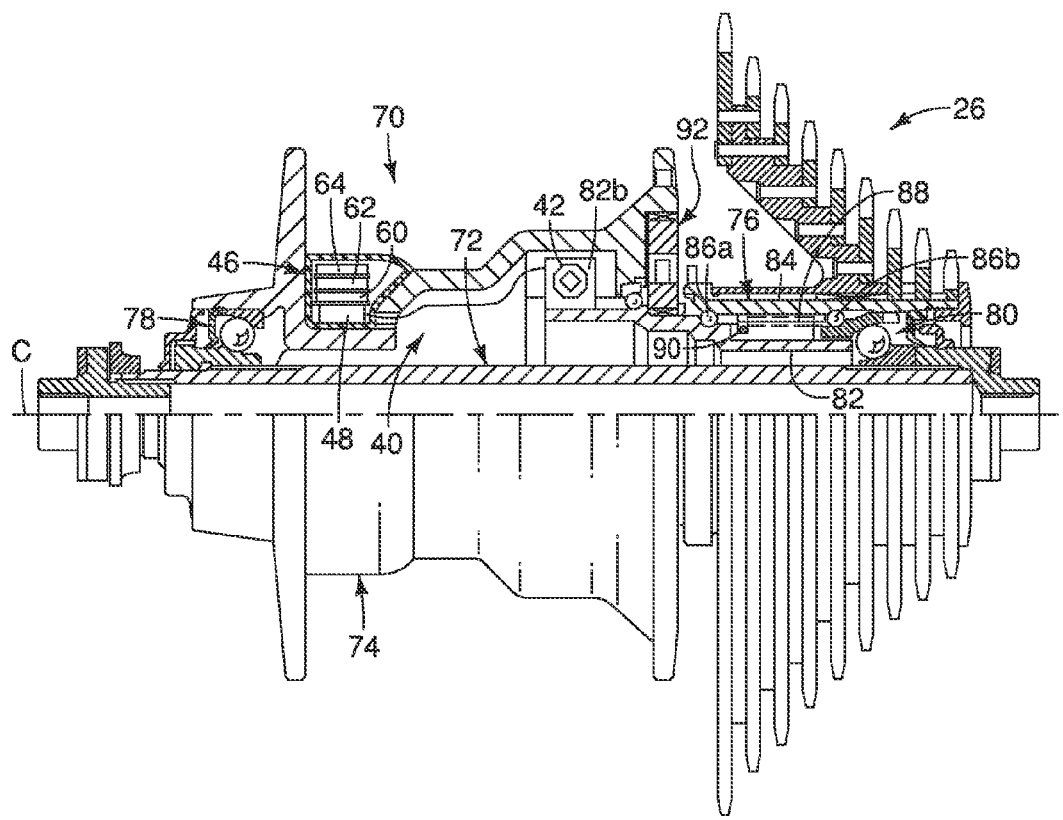
FIG. 5 is a half cross sectional view of a bicycle rear hub equipped with the bicycle power sensing apparatus in accordance with one illustrative embodiment.
Figure 6:
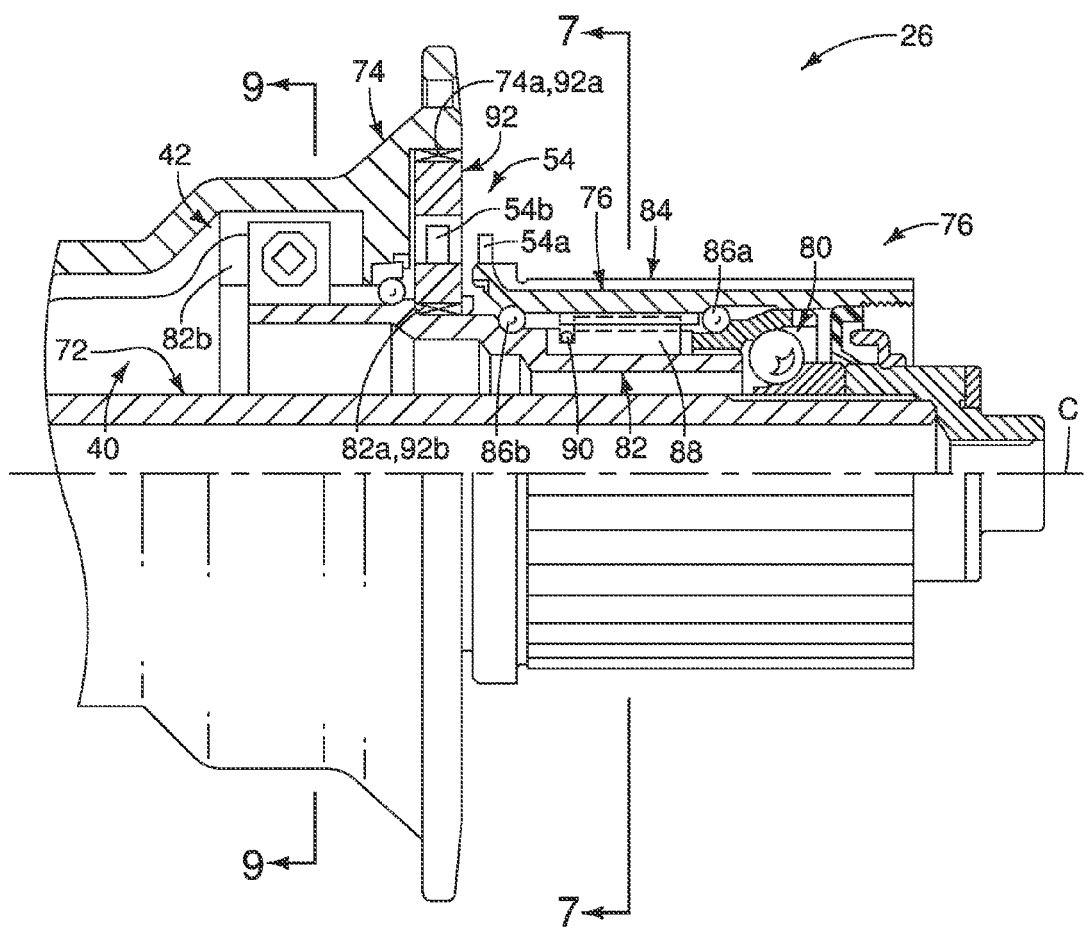
FIG. 6 is an enlarged half cross sectional view of a right end portion the bicycle rear hub illustrated in FIG. 5.

As seen in FIGS. 5 and 6, a rear hub 70 is illustrated that is equipped with the bicycle power sensing apparatus 40. The rear hub 70 rotatably supports the rear wheel 20 on the frame 12. In the illustrated embodiment, the rear hub 70 basically includes a hub shaft or axle 72, a hub shell 74 and a freewheel 76. The hub shaft or axle 72 has a center longitudinal axis that defines a center rotational axis C of the hub shell 74. The hub shell 74 is supported in the hub shaft 72 so as to rotate freely as explained below. The hub shell 74 constitutes a driven member that receives a driving torque or force from the chain 28 via the rear gear cassette 26 that are mounted on the freewheel 76.

A first end of the hub shell 74 is rotatably supported on a first end of the hub shaft 72 by a first bearing 78. The freewheel 76 is rotatably supported on a second end of the hub shaft 72 by a second bearing 80. A second end of the hub shell 74 is also supported on the second end of the hub shaft 72 via the freewheel 76 and the second bearing 80.

Basically, the controller 46 calibrates the power sensing device 42 while the rotation detecting device 54 detects relative rotation occurring between the hub shell 74 (i.e., the driven member) and the drive member of the freewheel 76 as discussed below. The calibration signal generating device 44 directly or indirectly detects a relative rotational status between a rear sprocket of the rear gear cassette 26 and the rear hub 70 in determining whether to start the a calibration procedure.

Preferably, the controller 46 records a signal level of power the (e.g., a torque or three) output signal from the power sensing device 42 as a non-load level while the rotation detecting device 54 detects relative rotation between the drive member and the driven member. The controller 46 executes a calibration process to calibrates the power sensing device 42 upon an occurrence of at least one of: (i) a startup operation of the bicycle power sensing apparatus, (ii) a set up operation of a battery to the controller 46, and (iii) an input operation of an input device operatively connected to the controller 46, while the rotation detecting device 54 detects relative rotation between the drive member and the driven member.

The rear hub 70 is basically conventional, except for the addition of the bicycle power sensing apparatus 40 and the modifications to accommodate the bicycle power sensing apparatus 40. Thus, the rear hub 70 will not be discussed and/or illustrated in detail herein. Rather, the parts of the rear hub 70 will only be discussed briefly to aid in explaining the bicycle power sensing apparatus 40.

As seen in FIG. 5, in the first embodiment, the hub shell 74 has the controller 46 mounted thereto and protected by anonmetallic cover so that the wireless signal of the communication unit 64 can be transmitted without interference. The electrical power source 48 is mounted to the interior of the hub shell 74. The electrical power source 48 is a rechargeable battery in this illustrated embodiment.

The rear gear cassette 26 is mounted on the freewheel 76 for transferring the pedaling action of the front crankset 24 via the chain 28 to rotate the rear wheel 20 in a forward movement direction. The freewheel 76 is also configured and arranged to allow the rear wheel 20 to rotate relative to the rear gear cassette 26 when the rider stops pedaling and the bicycle 10 continues to move in a forward direction. The freewheel 76 basically includes an inner tubular member 82, an outer tubular member 84, a pair of bearing assemblies 86a and 86b, a pair of clutch pawls 88, and a biasing member 90.

The inner tubular member 82 is fixed to the hub shell 74 by a fixing member 92 such that the inner tubular member 82 and the hub shell 74 rotate together on the hub shaft 72. On the other hand, the outer tubular member 84 is rotatably supported on the inner tubular member 82 by the bearing assemblies 86a and 86b such that the outer tubular member 84 rotates relative to the hub shell 74 on the hub shaft 72. The outer peripheral surface of the outer tubular member 84 is provided with a plurality of axially extending splines for engaging corresponding splines of the rear gear cassette 26 in a conventional manner.

The clutch pawls 88 and the biasing member 90 are disposed in between the inner and outer tubular members 82 and 84. The outer peripheral surface of the inner tubular member 82 pivotally supports the clutch pawls 88. The inner peripheral surface of the outer tubular member 84 has a plurality of circumferentially arranged ratchet teeth that are engaged by the clutch pawls 88 to transfer torque from the outer tubular member 84 to the inner tubular member 82 as the rider pedals. The biasing member 90 biases the clutch pawls 88 to engage the ratchet teeth of the outer tubular member 84. In this way, a one-way clutch is formed by the clutch pawls 88, the biasing member 90 and the opposed peripheral surfaces of the inner and outer tubular members 82 and 84. Thus, with this one-way clutch, the clutch pawls 88 transfer forward rotation of the outer tubular member 84 (i.e., rotation corresponding to forward movement of the bicycle) to the inner tubular member 82, but does not transfer rearward rotation of the outer tubular member 84 to the inner tubular member 82.

Figure 7:
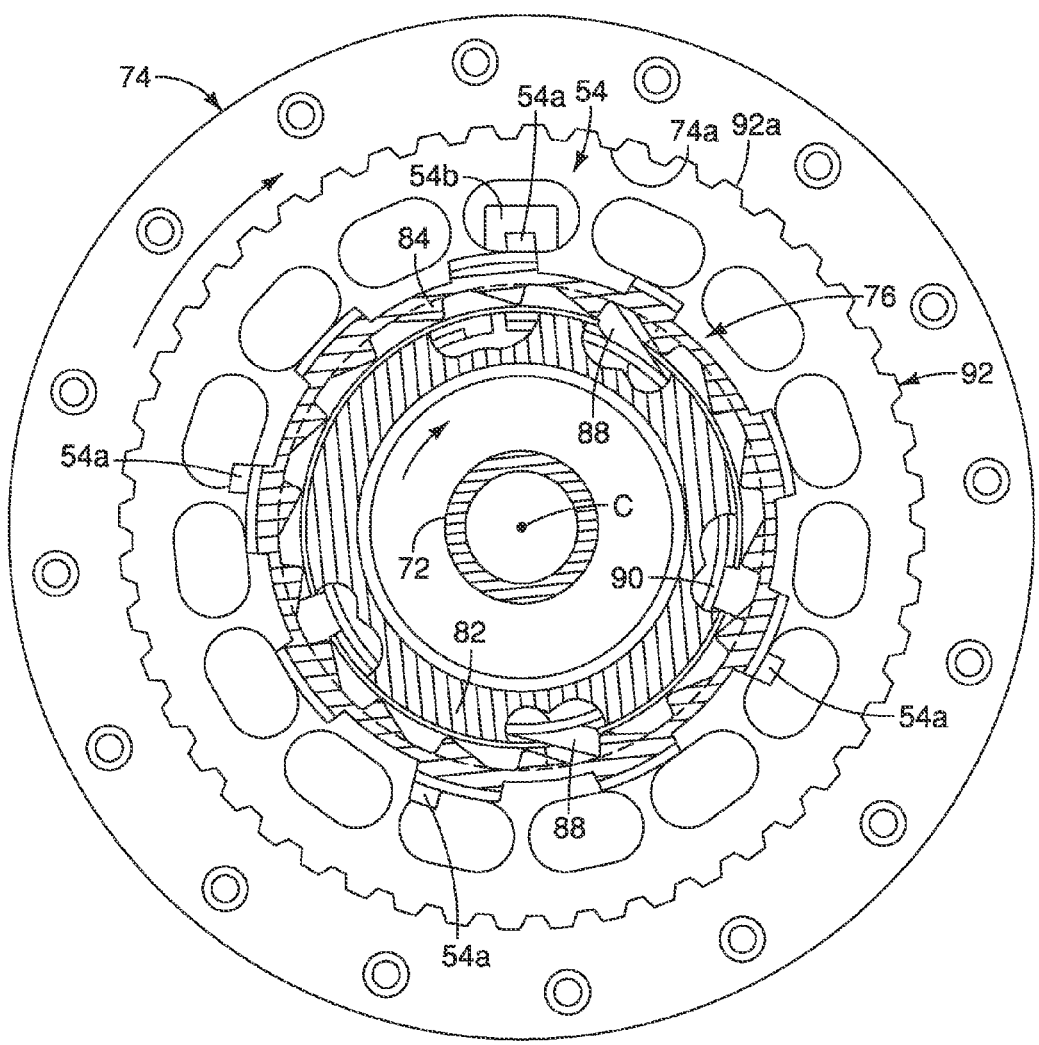
FIG. 7 is a cross-sectional view of the bicycle rear hub taken along section line 7-7 in FIG. 6.
Figure 8:
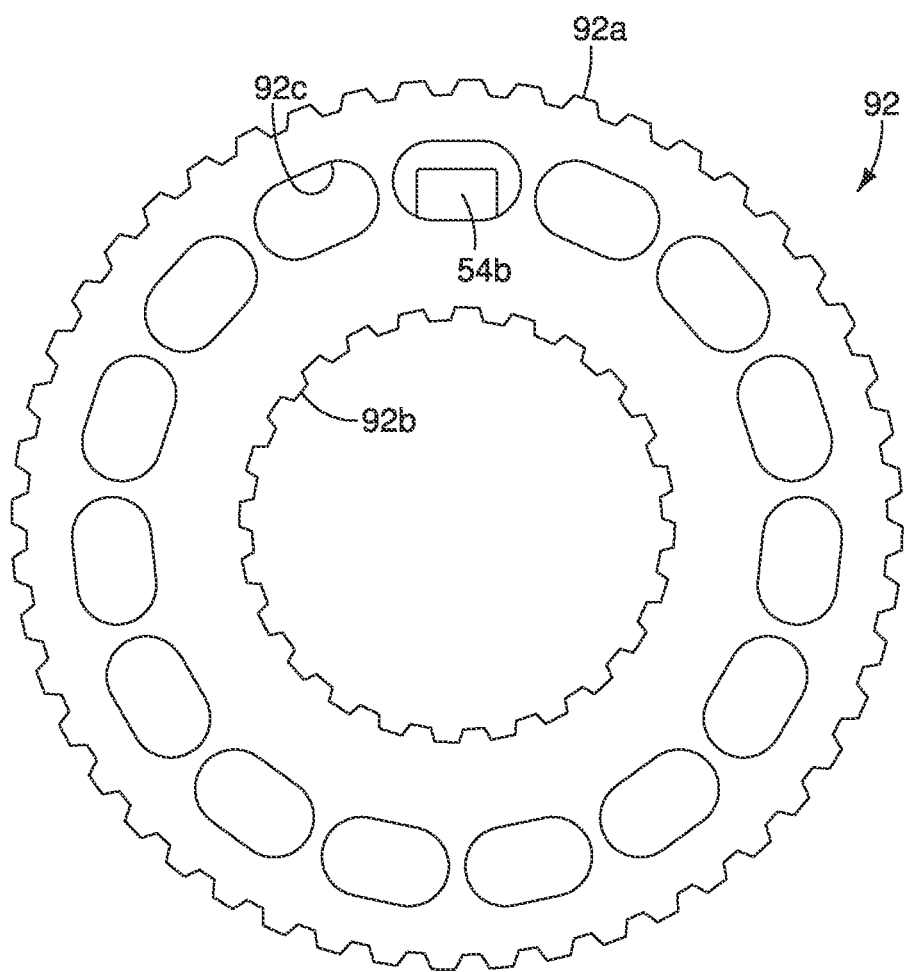
FIG. 8 is an elevational view of the fixing member that fixes an inner tubular member to the hub shell such that the inner tubular member and the hub shell rotate together on the hub shaft.

As seen in FIGS. 6 to 8, the fixing ember 92 has an outer peripheral surface with a plurality of axially extending splines or teeth 92a, an inner peripheral surface with a plurality of axially extending splines or teeth 92b and a body portion with a plurality of openings 92c. The splines 92a engage corresponding splines 74a of the hub shell 74 such that the hub shell 74 and the fixing member 92 are non-rotatably fixed together without any relative rotational movement. The splines 92b engage corresponding splines 82a of the inner tubular member 82 such that the inner tubular member 82 and the fixing member 92 are non-rotatably fixed together without any relative rotational movement. In this way, a drive force or power inputted to the inner tubular member 82 can be transmitted to the hub shell 74 via the fixing member 92. In other words, the fixing member 92 is provided on a driving force transferring path which spans from the inner tubular member 82 to the hub shell 74.

In the rear hub 70, the hub shaft 72 constitutes one example of a stationary member, while the hub shell 74 constitutes one example of a driven member that is rotatably mounted relative to the stationary member (i.e., the hub shaft 72). The outer tubular member 84 of the freewheel 76 constitutes one example of a drive member that is rotatably mounted relative to the stationary member (i.e., the hub shaft 72). The inner tubular member 82 and the fixing member 92 constitutes one example of a torque coupling member that is operatively arranged between the drive member (i.e., the outer tubular member 84) and the driven member (i.e., the hub shell 74) to selectively transmit torque from the drive member (i.e., the outer tubular member 84) to the driven member (i.e., the hub shell 74). Of course, the parts of the rear hub constituting the drive member, the driven member and the torque coupling member depends on the particular construction of the rear hub.

In the illustrated embodiment of the rear hub 70, the detected element 54a of the rotation detecting device 54 is in the form of a plurality of magnets. The magnets (e.g., the detected element 54a) are mounted on the outer tubular member 84 (i.e., a part of the drive member) as seen in FIG. 7. The detecting sensor 54b in the rear hub 70 of the illustrated embodiment is in the form of a reed switch or a Hall Effect device that is mounted on the fixing member 92 (i.e., a part of the torque coupling member). The detecting sensor 54b detects the presence of the magnets of the detected element 54a to determine if the outer tubular member 84 is rotating relative to the hub shaft 72. In other words, the rotation detecting device 54 is arranged to detect a rotational status between the hub shell 74 (i.e., the driven member) and the outer tubular member 84 (i.e., the drive member). Thus, the rotation detecting device 54 can determine if the bicycle is not moving (i.e., no pedaling force is being applied to the drive train 22). If the rotation detecting device 54 detects the rotation, then the controller 46 determines that the hub shell 74 (i.e., the driven member) and the outer tubular member 84 (i.e., the drive member) rotate relative is occurring, in this situation, the inner tubular member 82 and the fixing member 92 (the torque coupling member) do not transmit torque from the outer tubular member 84 (i.e., the drive member) to the hub shell 74 (i.e., the driven member). So, rotation detecting device 54 determines that the torque on the inner tubular member 82 and the fixing member 92 is Zero (0). If the rotation detecting device 54 does not detect the rotation, there is possible that the hub shell 74 and the outer tubular member 84 are rotated together as a unit or stopped together without any force being applied to them.

While several magnets are used as the detected element 54a in the first illustrated embodiment, it will be apparent to those skilled from this disclosure that the detected element 54a can be a single magnet if needed and/or desired. As mentioned above, alternatively, the detected element 54a can be, for example, a member with one or more openings and the detecting sensor 54b can be, for example, an optical sensor that detects an opening. In any case, the rotation detecting device 54 includes at least one of the detected element 54a (e.g., a magnet) disposed on one of the drive member (e.g., the outer tubular member 84) and the driven member (e.g., the hub shell 74), and the rotation detecting device 54 includes a sensor disposed on the other of the drive member (e.g., the outer tubular member 84) and the driven member (e.g., the hub shell 74).

Figure 9:
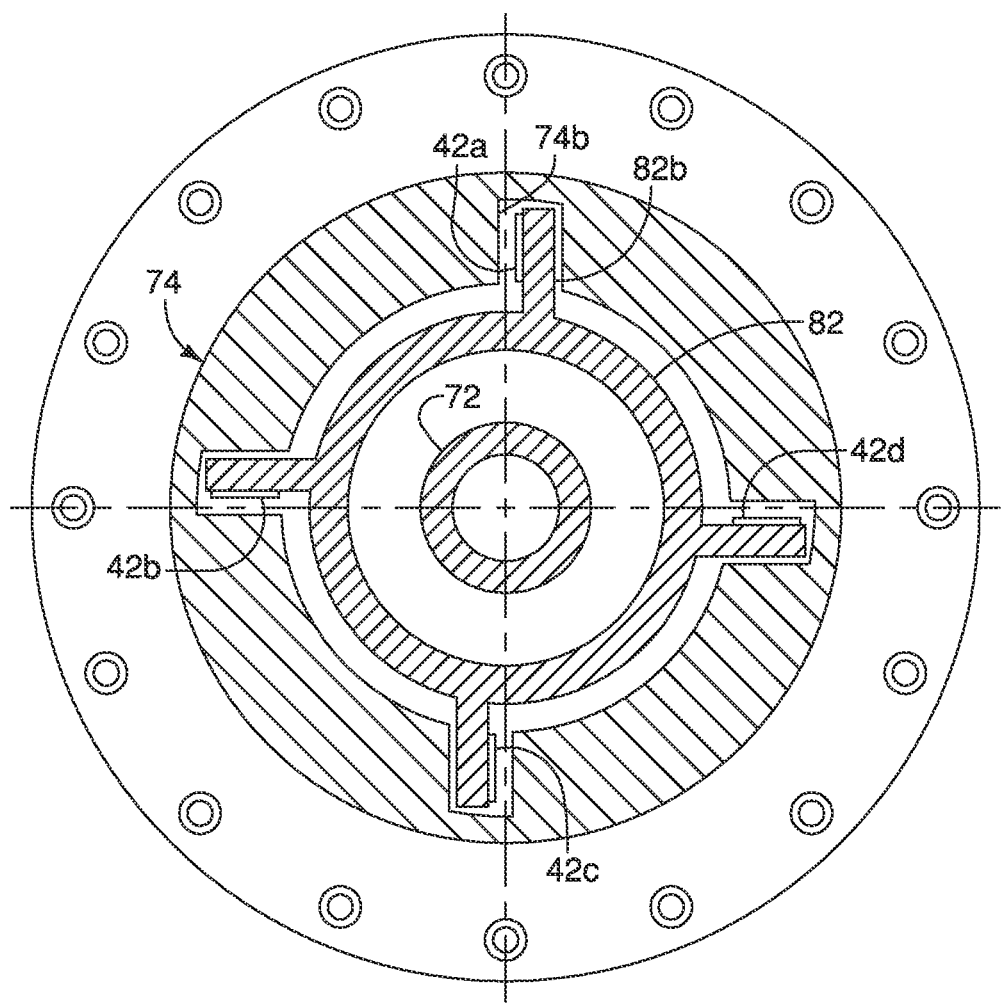
FIG. 9 is a cross-sectional view of the bicycle rear hub taken along section line 9-9 in FIG. 6.

In the first illustrated embodiment, as seen in FIGS. 5, 6, 9 and 10, the power sensing device 42 is arranged to detect a power (i.e., a force or a torque) transmitted to the hub shell 74 (i.e., the driven member) from the outer tubular member 84 (i.e., the drive member). More specifically, in the first illustrated embodiment of the rear hub 70, the power sensing device 42 is disposed on an extension part 82b of the inner tubular member 82 (i.e., a part of the torque coupling member). As seen in FIG. 9, the power sensing device 42 is in the form of several sensors 42a to 42d, which are disposed on the extension part 82b of the inner tubular member 82. As seen in FIG. 9, the extension part 82b is in the form of four radially extending flanges with one of the sensors 42a to 42d disposed on each of the flanges of the extension part 82b. The sensors 42a to 42d on the extension part 82b are spaced a predetermined distance from circumferentially facing surfaces 74b of the hub shell 74.

Figure 10:
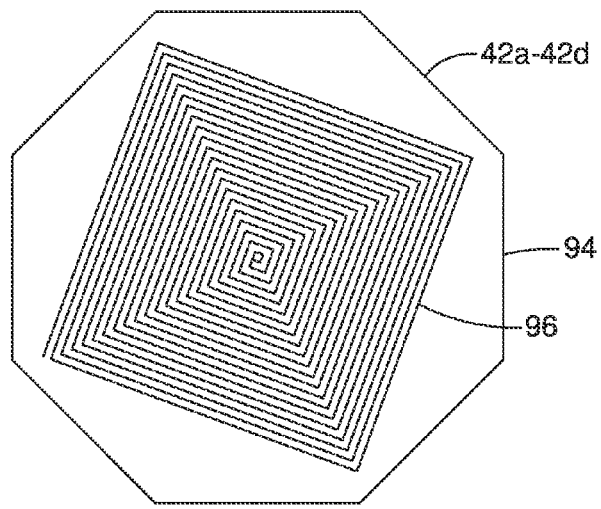
FIG. 10 is an elevational view illustrating one of the sensors of the power sensing device.

While several sensors are used as the power sensing device 42 in the illustrated embodiment, it will be apparent to those skilled from this disclosure that the sensors 42a to 42d can be replaced a single sensor if needed and/or desired. As illustrated in FIG. 10, each of the sensors 42a to 42d of the power sensing device 42 is formed as an induction coil sensor in which a substrate 94 has a coil 96 formed in the substrate 94. Each of the substrates 94 is mounted to one of the flanges of the extension part 82b. Alternatively, other displacement sensors can be used for the sensors 42a to 42d. For example, the sensors 42a to 42d can be capacitor sensors or optical sensors that detect an amount relative deflection between the sensors 42a to 42d on the extension part 82b and the surfaces 74b of the hub shell 74. In any event, the sensors 42a to 42d are configured and arranged to detect a difference (displacement) in the distance between the sensors 42a to 42d on the extension part 82b and the surfaces 74b of the hub shell 74 that occurs when a torque is inputted to the rear hub 70 by the freewheel 76.

Accordingly, while a rider is pedaling the crankset 24, the rear gear cassette 26 will be rotated by the chain 28. This rotation of the rear gear cassette 26 will rotate the hub shell 74. Thus, a torque will be transmitted between the rear gear cassette 26 and the hub shell 74, either the inner tubular member 82 or the fixing member 92, or both will undergo a slight amount of resilient flexing due to the application of a pedaling force that is transmitted to the rear hub 70. In other words, when the hub shell 74 and the inner tubular member 82 are rotating together, the inner tubular member 82 will move slightly in the rotational direction based on the pedaling force from the rider. As the pedaling force becomes greater, the amount of relative deflection between the hub shell 74 and the inner tubular member 82 also becomes greater. As mentioned above, the sensors 42a to 42d detect the torque amount applied to the rear hub 70 based on the detected difference in the distance between the sensors 42a to 42d on the extension part 82b and the surfaces 74b of the hub shell 74 when a torque is inputted to the rear hub 70 by the freewheel 76 as seen in FIG. 9. In other words, the sensors 42a to 42d of the power sensing device 42 constitute a driving force measuring part that is able to measure a gap between each of the surfaces 74b of the hub shell 74 and the sensors 42a to 42d on the extension part 82b and the displacement of the gap when a torque is applied to the freewheel 76.

In the illustrated embodiment of the rear hub 70, the calibration signal generating device 44, the controller 46 and the electrical power source 48 are mounted on the hub shell 74. The controller 46 is electrically connected to the power sensing device 42, the calibration signal generating device 44, the electrical power source 48 and the rotation detecting device 54. The electrical power source 48 supplies power to all of the other components of the bicycle power sensing apparatus 40 either directly or in directly as needed. The controller 46 is operatively arranged to receive a power (e.g., a torque or force) output signal from the power sensing device 42 and a rotational movement output signal from the rotation detecting device 54. The power (e.g., a torque or force) output signal is indicative of the power (e.g., a torque or force) being inputted to the rear hub 70 via one of the sprockets of the rear gear cassette 26 as a result of a rider's pedaling. The rotational movement output signal is indicative of the relative rotation between the hub shell 74 (i.e., the driven member) and the outer tubular member 84 (i.e., the drive member).

Figure 11:
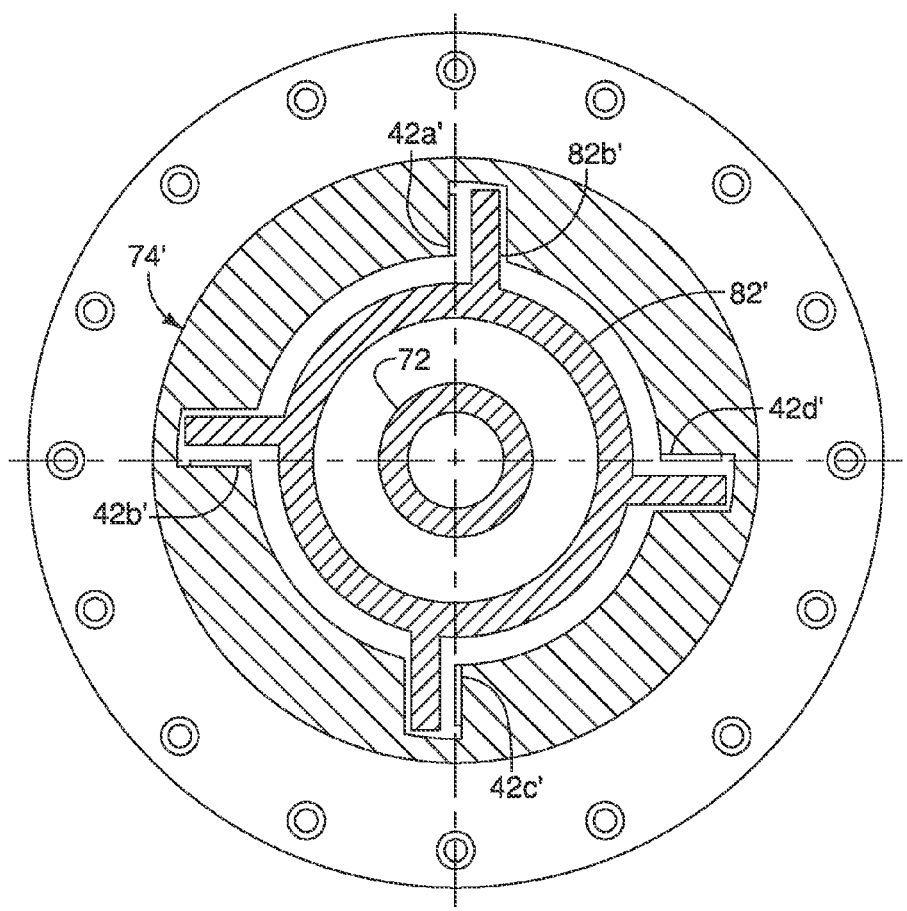
FIG. 11 is a cross-sectional view, corresponding to FIG. 9, of a main portion of a bicycle rear hub in accordance with an alternative embodiment.

Referring now to FIG. 11, a cross-sectional view, corresponding to FIG. 9, of a main portion of a bicycle rear hub in accordance with an alternative embodiment. While the sensors 42a to 42d are illustrated as being fixed to the flanges of the extension part 82b of the inner tubular member 82 in FIGS. 5, 6 and 9, it will be apparent to those skilled from this disclosure that the sensors 42a to 42d can be fixed to the surfaces 74b of the hub shell 74 as illustrated in FIG. 11. Thus, the locations of the sensors 42a to 42d can be disposed in other locations and/or on other parts than the ones shown if needed and/or desired.

Figure 12:
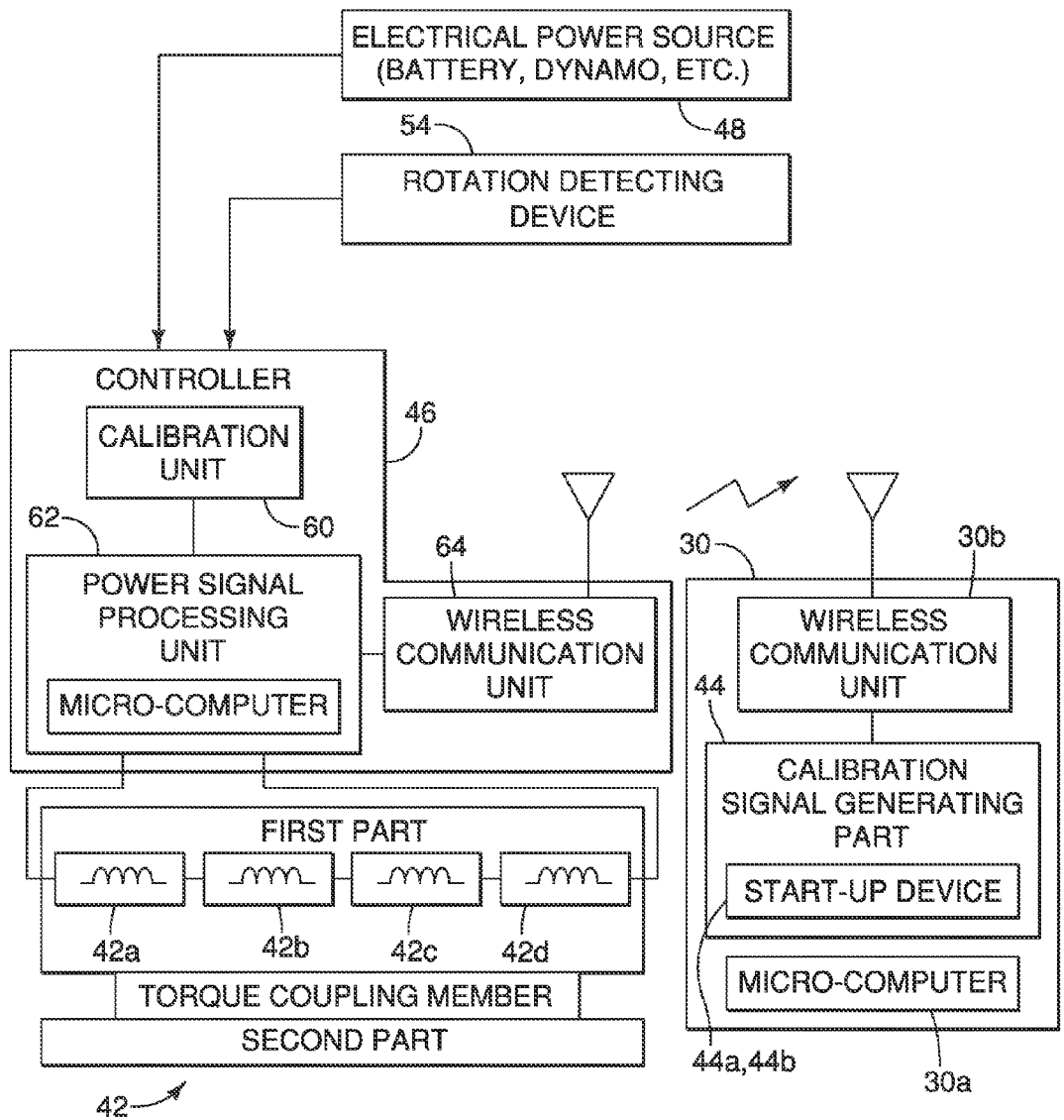
FIG. 12 is a schematic block diagram showing an overall configuration of the power sensing device in which coil sensors are arranged in series.
Figure 13:
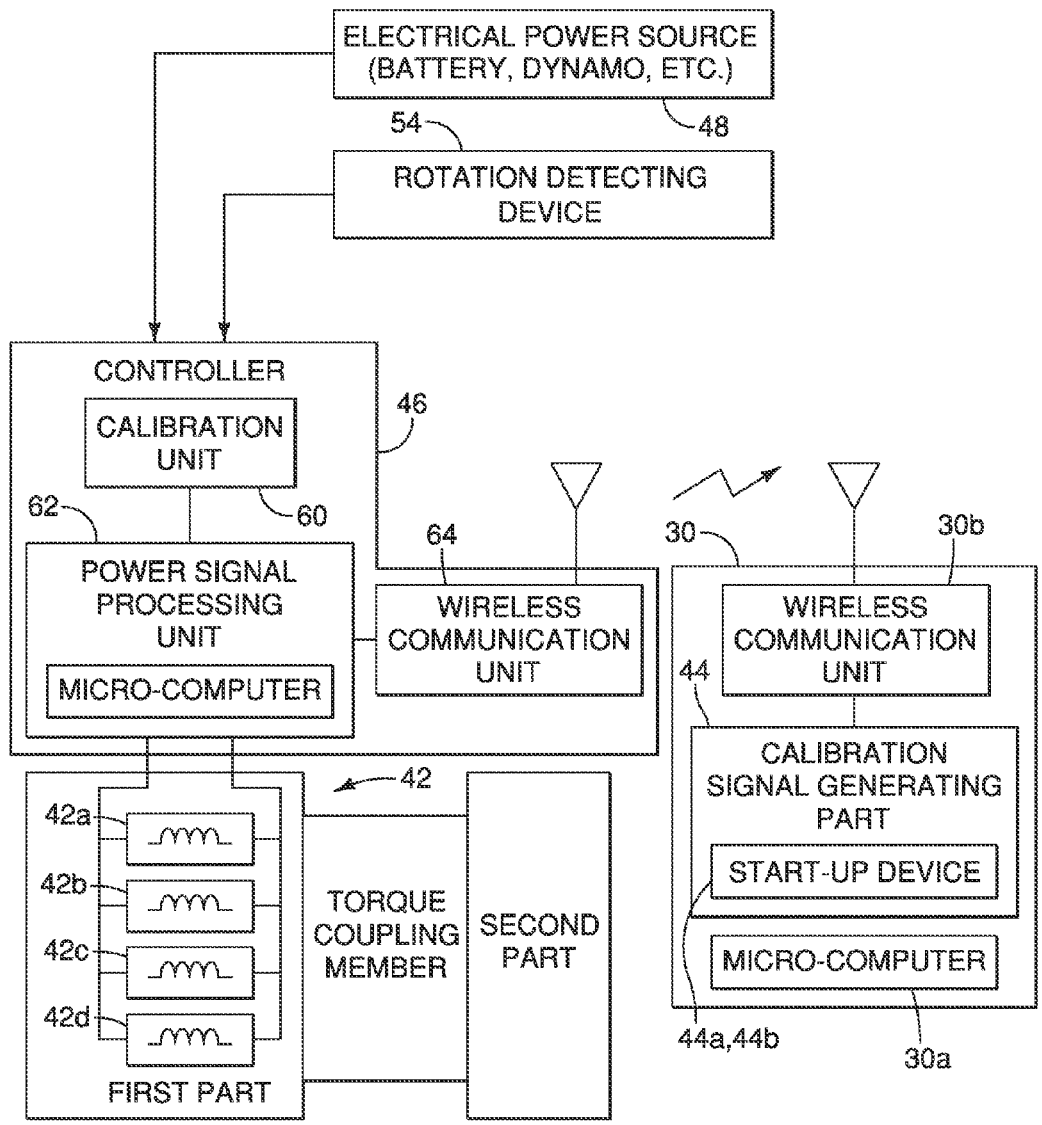
FIG. 13 is a schematic block diagram showing an overall configuration of the power sensing device in which coil sensors are arranged in parallel.

Accordingly, the basic bicycle power sensing apparatus with the present calibrating feature is diagrammatically illustrated in FIGS. 12 and 13. FIG. 12 illustrates the sensors 42a to 42d being electrically connected in series, while FIG. 13 illustrates the sensors 42a to 42d being electrically connected in parallel. In either case, the sensors 42a to 42d are electrically connected to the power signal processing unit 62 that receives and processes the power signals from the sensors 42a to 42d. The output signal from the sensors 42a to 42d is processed by the signal processing unit 62, and is then outputted to the wireless transmission unit 64. When coil sensors are used for the sensors 42a to 42d, the power signal processing unit 62 is provided with an oscillation circuit, a signal processing circuit and a communication circuit for processing the output signal from the sensors 42a to 42d.

The oscillation circuit of the power signal processing unit 62 oscillates the output signal from the coils 94 of the sensors 42a to 42d. The oscillation circuit of the power signal processing unit 62 is realized using, for example, an oscillation circuit. In this way, the power signal processing unit 62 calculates and outputs a rotational torque applied to the hub shell 74 on the basis of the torsion signal detected by the sensors 42a to 42d of the power sensing device 42. The signal processing circuit of the power signal processing unit 62 outputs a signal which is oscillated by the oscillation circuit of the power signal processing unit 62 to the wireless transmission unit 64 via the communication circuit of the power signal processing unit 62 by being converted to serial data. The wireless transmission unit 64 is a part of the controller 46, which includes a micro-computer for controlling the transmission of wireless transmission unit 64. Alternatively, the wireless transmission unit 64 can have its own micro-computer. The wireless transmission unit 64 wirelessly transmits the signal indicating the driving force which is processed by the power signal processing unit 62 to the cycling computer 30. The cycling computer 30 which includes a micro-computer 30a and a wireless transmission unit 30b for conducting two-way communication with the wireless transmission unit 64.

As seen in FIGS. 12 and 13, the sensors 42a to 42d are mounted on a part that is located adjacent a second part with a torque coupling member interconnecting them. In other words, the first part can be either a driven member or a drive member and the second part can be the other of the driven member and the drive member with the torque coupling member interconnecting them. Thus, the bicycle power sensing apparatus is not limited to a rear hub and the arrangement illustrated in FIGS. 4 to 11.

Figure 14:
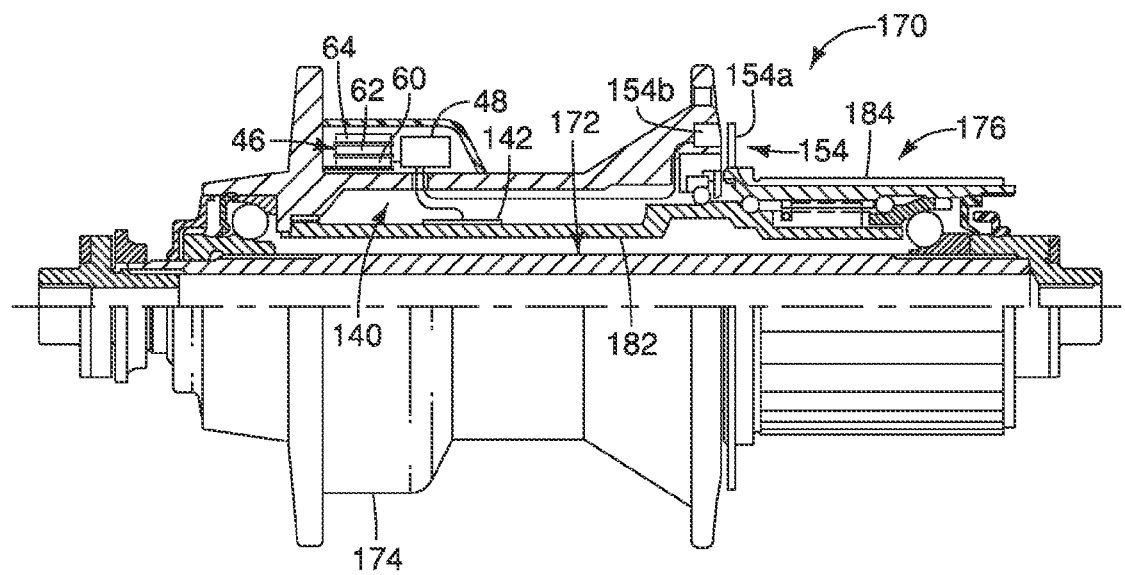
FIG. 14 is a half cross sectional view of a bicycle rear hub equipped with a bicycle power sensing apparatus in accordance with another illustrative embodiment.

Referring now to FIG. 14, a bicycle power sensing apparatus 140 in accordance with another illustrative embodiment will now be discussed. In addition to the calibration signal generating device 44, the controller 46, and the electrical power source 48 of the first embodiment, as discussed above, the bicycle power sensing apparatus 140 further includes a power sensing device 142 electrically connected to the controller 46 and a rotation detecting device 154 electrically connected to the controller 46. Basically, the bicycle power sensing apparatus 140 only differs from the bicycle power sensing apparatus 40 in that the power sensing device 142 is a strain sensor (e.g. a strain gauge that including a strain detecting semiconductor sensor) instead of a plurality of coil sensors and the rotation detecting device 154 is arranged differently from the first embodiment. Here, a bicycle rear hub 170 is illustrated that is equipped with the bicycle power sensing apparatus 140. The rear hub 170 basically includes a hub shaft or axle 172, a hub shell 174 and a freewheel 176. Similar to the freewheel 76, discussed above, the freewheel 176 includes an inner tubular member 182 and an outer tubular member 184 that are selectively coupled by a one-way clutch as described above. The inner tubular member 182 is fixed to the hub shell 174 by a screw connection as shown. In this embodiment, the inner tubular member 182 constitutes a torque coupling member that transmits torque from the outer tubular member 184 (i.e., the drive member) to the hub shell 174 (i.e., the driven member) while the outer tubular member 184 rotates in a driving direction in which the one-way clutch is engaged. The power sensing device 142 is a strain sensor disposed on the inner tubular member 182 (i.e., the torque coupling member) for detecting strain in the inner tubular member 182 in a conventional manner. The rotation detecting device 154 has at least one detected element 154a (e.g., magnet) mounted on the outer tubular member 184 and at least one a detecting sensor 154b mounted on the hub shell 174.

Figure 15:
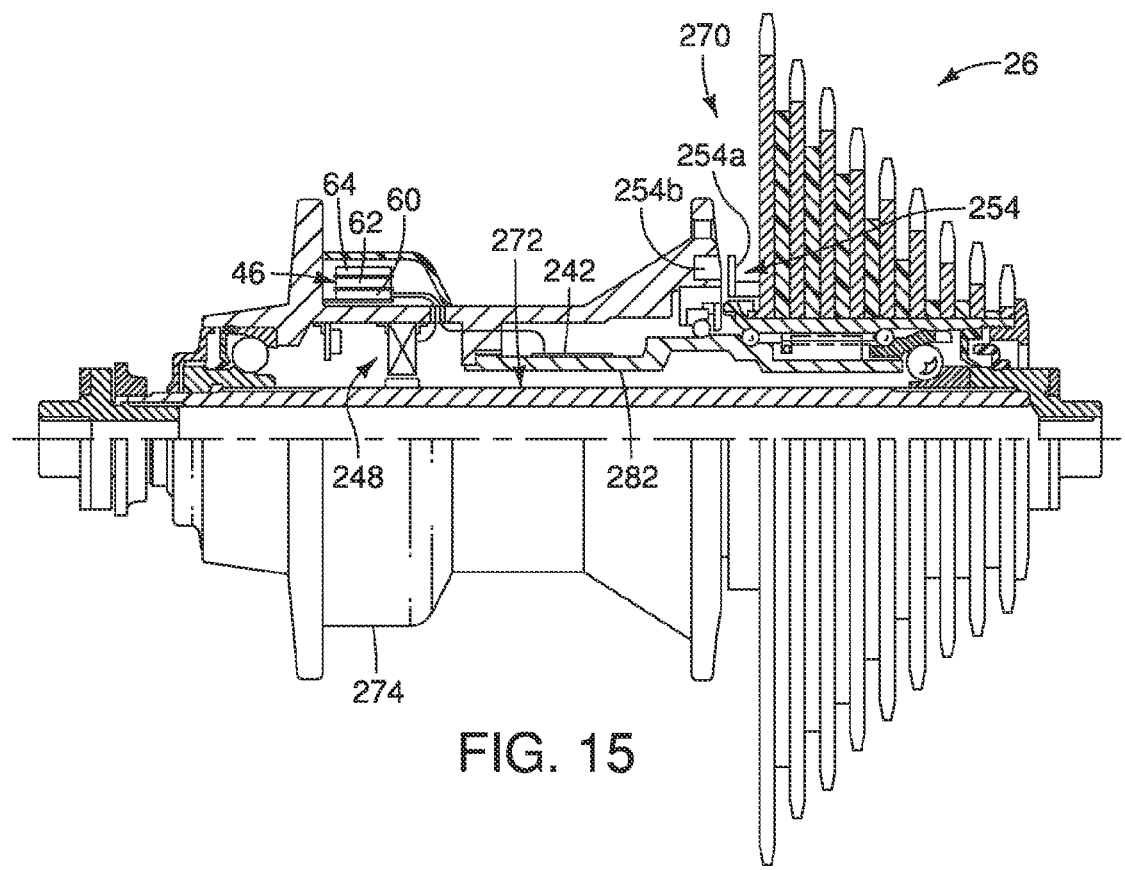
FIG. 15 is a half cross sectional view of a bicycle rear hub equipped with a bicycle power sensing apparatus in accordance with another illustrative embodiment.

Referring now to FIG. 15, a bicycle power sensing apparatus 240 in accordance with another illustrative embodiment will now be discussed. In addition to the calibration signal generating device 44 and the controller 46 of the first embodiment, as discussed above, the bicycle power sensing apparatus 240 further includes a power sensing device 242 electrically connected to the controller 46 and a power generator 248 as an electrical power source for supplying electrical energy to the controller 46 and the power sensing device 242 and a rotation detecting device 254 electrically connected to the controller 46. Basically, the bicycle power sensing apparatus 240 only differs from the bicycle power sensing apparatus 40 in that (1) the battery is replaced by the power generator 248, (2) the coil sensors are replaced with the power sensing device 242 which is a strain sensor (e.g. a strain gauge that including a strain detecting semiconductor sensor), and (3) the rotation detecting device 254 is arranged differently from the first embodiment. Here, a bicycle rear hub 270 is illustrated that is equipped with the bicycle power sensing apparatus 240. The rear hub 270 basically includes a hub shaft or axle 272, a hub shell 274 and a freewheel 276. Similar to the freewheel 76, discussed above, the freewheel 276 includes an inner tubular member 282 and an outer tubular member 284 that are selectively coupled by a one-way clutch as described above. The inner tubular member 282 is fixed to the hub shell 274 by a screw connection as shown. In this embodiment, the inner tubular member 282 constitutes a torque coupling member that transmits torque from the outer tubular member 284 (i.e., the drive member) to the hub shell 274 (i.e., the driven member) while the outer tubular member 284 rotates in a driving direction in which the one-way clutch is engaged. The power sensing device 242 is mounted on the inner tubular member 282 for detecting strain in the inner tubular member 282 in a conventional manner. The rotation detecting device 254 has at least one detected element 254a (e.g., magnet) mounted on a sprocket mounted on the outer tubular member 284 and at least one a detecting sensor 254b mounted on the hub shell 274.

Figure 16:
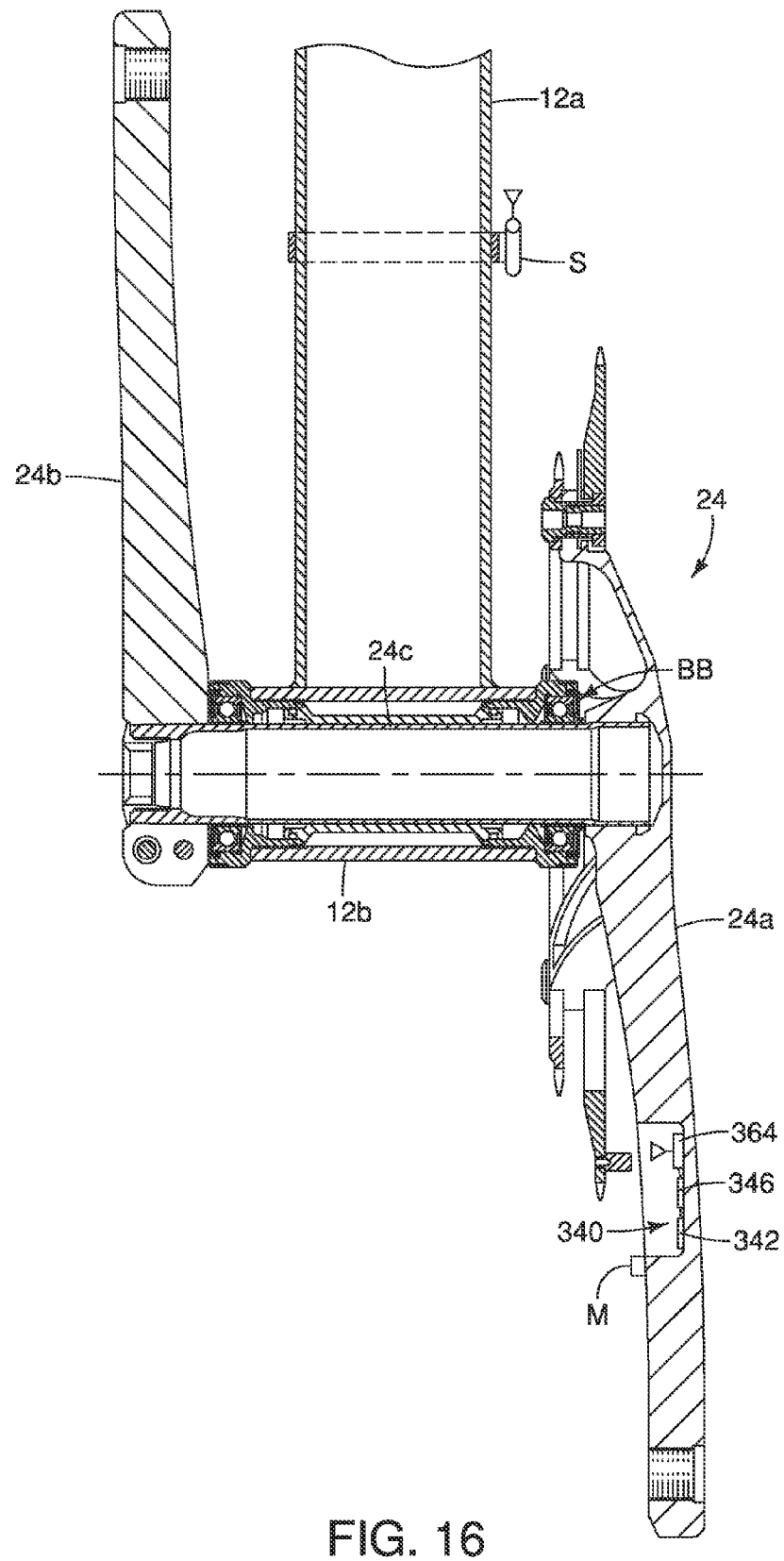
FIG. 16 is a cross sectional view of a portion of a bicycle in the area of the front crankset, which is equipped with a power sensing device in accordance with another illustrative embodiment.

Referring now to FIG. 16, the front crankset 24 has been equipped with a bicycle power sensing apparatus 340 in accordance with another illustrative embodiment. Here, the bicycle frame 12 has a seat tube 12a and a hanger tube 12b. A bottom bracket BB rotatably supports the front crankset 24 in the hanger tube 12b in a conventional manner. Basically, the front crankset 24 has a pair of crank arms 24a and 24b and a crank axle 24c. The crank arms 24a and 24b are fixed to opposite ends of the crank axle 24c. The crank axle 24c is rotatably mounted in the hanger tube 12b by the bottom bracket BB.

In this illustrative embodiment of FIG. 16, the bicycle power sensing apparatus 340 is mounted on the crank arms 24a. Basically, the bicycle power sensing apparatus 340 includes a power sensing device 342, a controller 346 and a wireless communication unit 364. The power sensing device 342 senses strain in the crank arm 24a occurring from a pedaling force applied to the crank arm 24a. In this illustrative embodiment, the power sensing device 342 is, for example, a conventional strain gauge sensor (see, e.g., U.S. Patent Application Publication No. 2009/0120208) to detect the pedaling force of the crank arm 24a. Similar to the first embodiment, the power sensing device 342 outputs strain detection signals to a power signal processing unit of the controller 346. Then the wireless communication unit 364 transmits the data from the power signal processing unit of the controller 346 to the cycling computer 30. Also the wireless communication unit 364 receives a calibration signal from the calibration signal generating device 44 (i.e., one of the calibration signal generating device 44a, 44b, 44c and 44d) such that a calibration unit of the controller 346 performs a calibration process as described above with respect to the first illustrative embodiment. Accordingly, the bicycle power sensing apparatus 340 is essentially identical to the bicycle power sensing apparatus 42, as discussed above, except that power sensing device 342 is mounted on the crank arm 24a to detect a strain resulting from a pedaling force that is transmitted thereto.

Figure 17:
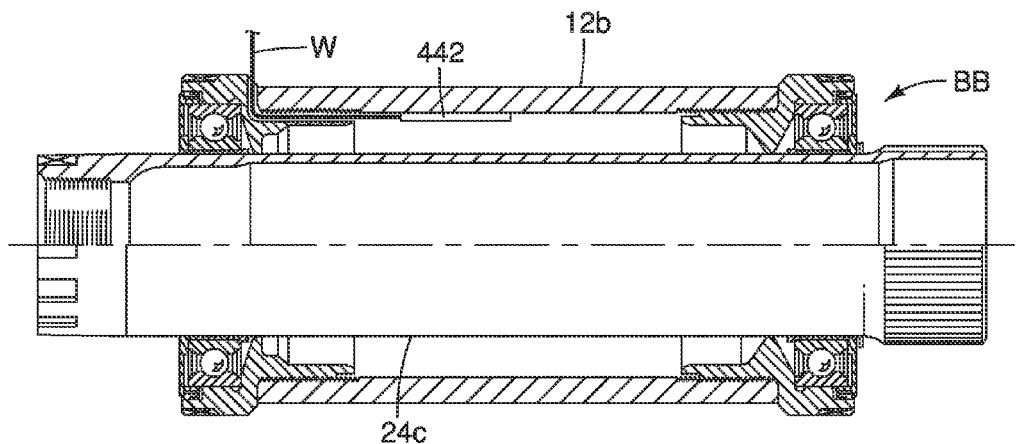
FIG. 17 is a cross sectional view of a bottom bracket and a hanger tube of a bicycle with the bottom bracket rotatably supporting a crank axle in the hanger tube, which is equipped with a power sensing device in accordance with another illustrative embodiment.

Referring now to FIG. 17, the hanger tube 12b of the bicycle frame 12 has been equipped with a power sensing device 442 in accordance with another illustrative embodiment. Here, the power sensing device 442 senses strain in the hanger tube 12b of the bicycle frame 12 occurring from a pedaling force applied to the crank axle 24c. In this illustrative embodiment, the power sensing device 442 is, for example a conventional strain gauge sensor (see, e.g., U.S.

Pat. No. 8,117,923) that is mounted on an interior surface of the hanger tube 12b of the bicycle frame 12 to detect the pedaling force transmitted to the hanger tube 12b. In this illustrative embodiment, the power sensing device 442 is connected to the controller 46 (FIG. 2) by an electrical wire W to output strain detection signals to the power signal processing unit 62. The controller 46 in this embodiment can be incorporated into the cycling computer 30 or can be a separate unit as needed and/or desired. Similar to the first embodiment, the power sensing device 442 outputs strain detection signals to the power signal processing unit 62. Then the communication unit 64 transmits the data from the power signal processing unit 62 to the cycling computer 30. Also the wireless communication unit 64 receives a calibration signal from the calibration signal generating device 44 (i.e., one of the calibration signal generating device 44a, 44b, 44c and 44d) such that the calibration unit 60 performs a calibration process as described above with respect to the first illustrative embodiment.

Figure 18:
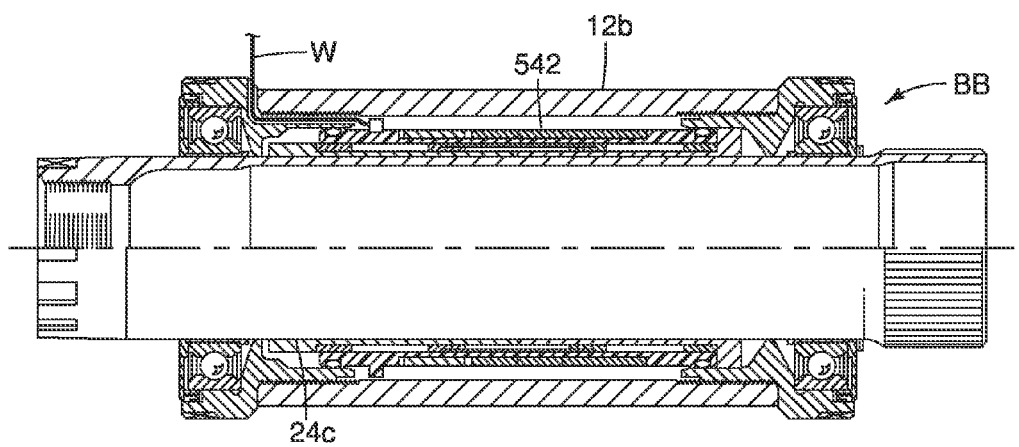
FIG. 18 is a cross sectional view of a bottom bracket and a hanger tube of a bicycle with a crank axle rotatably mounted in the hanger tube by the bottom bracket, which is equipped with a bicycle power sensing apparatus in accordance with another illustrative embodiment.

Referring now to FIG. 18, the bottom bracket BB has been equipped with a power sensing device 542 in accordance with another illustrative embodiment. Here, the power sensing device 542 senses strain in the crank axle 24c occurring from a pedaling force applied to the crank axle 24c. In this illustrative embodiment, the power sensing device 542 is, for example a conventional strain gauge sensor in the form of a torque sleeve such as disclosed in U.S. Pat. No. 7,516,677. Alternatively, the bottom bracket BB can include a power sensing device such as disclosed in U.S. Pat. No. 8,117,923. In any case, the power sensing device 542 is connected to the controller 46 (FIG. 2) by an electrical wire W to output strain detection signals to the power signal processing unit 62. The controller 46 in this embodiment can be incorporated into the cycling computer 30 or can be a separate unit as needed and/or desired. Similar to the first embodiment, the power sensing device 542 outputs strain detection signals to the power signal processing unit 62. Then the communication unit 64 transmits the data from the power signal processing unit 62 to the cycling computer 30. Also the wireless communication unit 64 receives a calibration signal from the calibration signal generating device 44 (i.e., one of the calibration signal generating device 44a, 44b, 44c and 44d) such that the calibration unit 60 performs a calibration process as described above with respect to the first illustrative embodiment.

Figure 19:
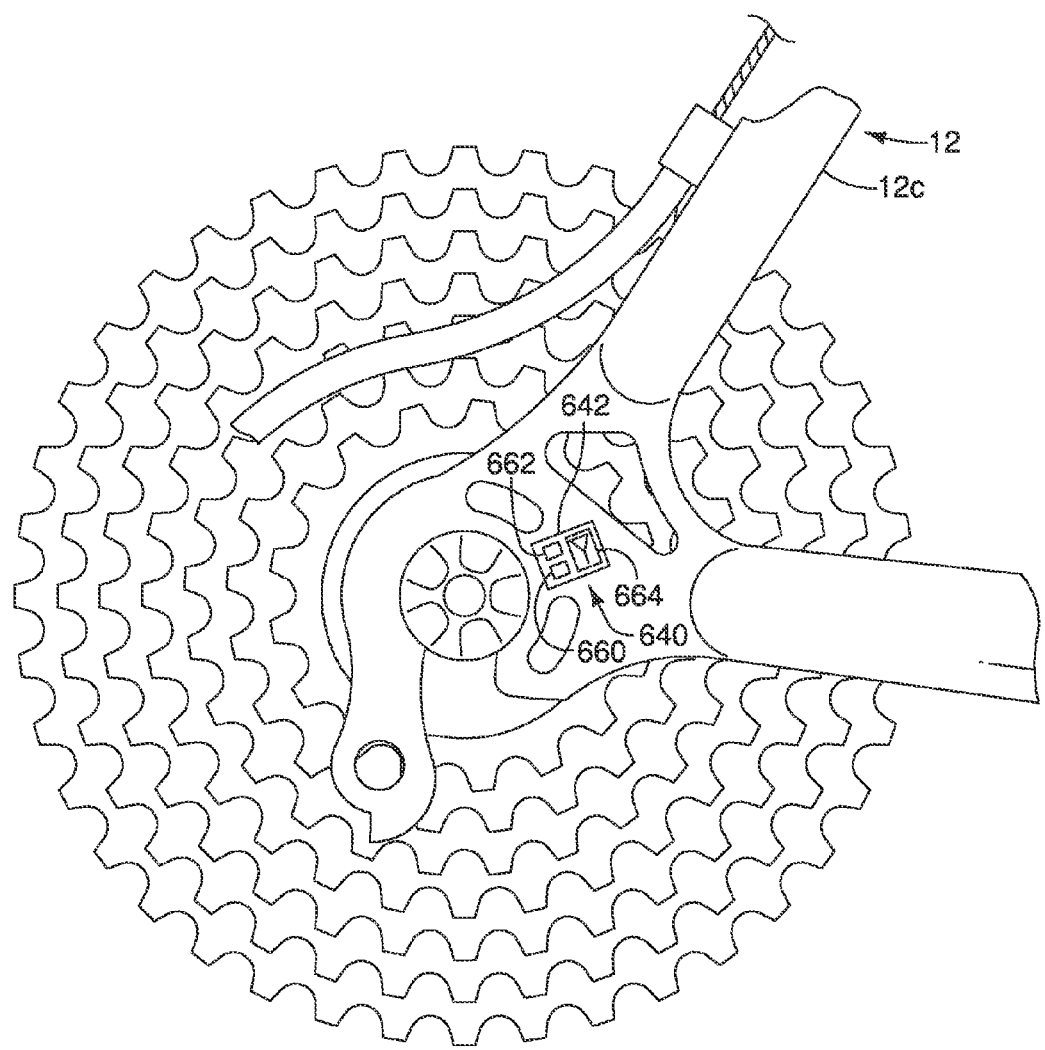
FIG. 19 is an elevational view of a rear frame portion of a bicycle frame, which is equipped with a bicycle power sensing apparatus in accordance with another illustrative embodiment.

Referring now to FIG. 19, a rear frame portion 12c of the bicycle frame 12 has been equipped with a bicycle power sensing apparatus 640 in accordance with another illustrative embodiment. Here, the bicycle power sensing apparatus 640 includes a power sensing device 642, a calibration unit 660, a power signal processing unit 662 and a wireless communication unit 664. The power sensing device 642 senses strain in the rear frame portion 12c of the bicycle frame 12 occurring from a pedaling force applied to the front crankset 24. In this illustrative embodiment, the power sensing device 642 is, for example a conventional strain gauge sensor that is mounted on an area of the rear frame portion 12.c of the bicycle frame 12 to detect the pedaling force transmitted to the bicycle frame 12 by the bicycle's drive train (see, e.g., U.S. Pat. No. 7,814,800). Similar to the first embodiment, the power sensing device 642 outputs strain detection signals to the power signal processing unit 662. Then the wireless communication unit 664 transmits the data from the power signal processing unit 662 to the cycling computer 30. Also the wireless communication unit 664 receives a calibration signal from the calibration signal generating device 44 (i.e., one of the calibration signal generating device 44a, 44b, 44c and 44d) such that the calibration unit 660 performs a calibration process as described above with respect to the first illustrative embodiment. Accordingly, the bicycle power sensing apparatus 640 is essentially identical to the bicycle power sensing apparatus 42, as discussed above, except that power sensing device 642 is mounted on the rear frame portion 12c to detect a strain resulting from a pedaling force that is transmitted thereto.

Figure 20:
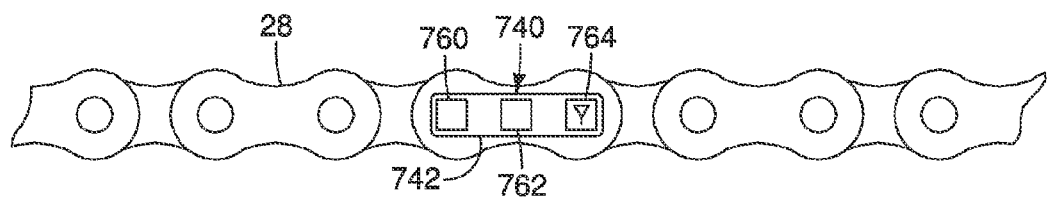
FIG. 20 is an elevational view of a portion of a bicycle chain, which is equipped with a bicycle power sensing apparatus in accordance with another illustrative embodiment.

Referring now to FIG. 20, a portion of the bicycle chain 28 has been equipped with a bicycle power sensing apparatus 740 in accordance with another illustrative embodiment. Here, the bicycle power sensing apparatus 740 includes a power sensing device 742, a calibration unit 760, a power signal processing unit 762 and a wireless communication unit 764. The power sensing device 742 senses strain in the bicycle chain 28 occurring from a pedaling force applied to the front crankset 24. In this illustrative embodiment, the power sensing device 742 is, for example a conventional strain gauge sensor that is mounted on one of the links of the bicycle chain 28 to detect the drive force of the bicycle chain 28 (see, e.g., U.S. Pat. No. 5,027,303 and U.S. Pat. No. 7,418,875). Similar to the first embodiment, the power sensing device 742 outputs strain detection signals to the power signal processing unit 762. Then the wireless communication unit 764 transmits the data from the power signal processing unit 762 to the cycling computer 30. Also the wireless communication unit 764 receives a calibration signal from the calibration signal generating device 44 (i.e., one of the calibration signal generating device 44a, 44b, 44c and 44d) such that the calibration unit 760 performs a calibration process as described above with respect to the first illustrative embodiment. Accordingly, the bicycle power sensing apparatus 740 is essentially identical to the bicycle power sensing apparatus 42, as discussed above, except that power sensing device 742 is mounted on the bicycle chain 28 to detect a strain resulting from a pedaling force that is transmitted thereto.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially change their operation. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle power sensing apparatus comprising:
a power sensing device;
a calibration signal generating device; and
a controller operatively arranged to receive a calibration signal from the calibration signal generating device, the controller calibrating the power sensing device as being at a non-load level of zero power input upon receiving the calibration signal.

2. The bicycle power sensing apparatus according to claim 1, wherein
the calibration signal generating device includes at least one of an input device, a tinier, a bicycle speed detecting device and a bicycle crank rotation detecting device.

3. The bicycle power sensing apparatus according to claim 1, wherein
the power sensing device is disposed on one of a rear wheel, a crank assembly part, a bottom bracket part, a frame portion, and a chain.

4. The bicycle power sensing apparatus according to claim 1, further comprising
a stationary member;
a drive member rotatably mounted relative to the stationary member;
a driven member rotatably mounted relative to the stationary member; and
a torque coupling member operatively arranged between the drive member and the driven member to selectively transmit torque from the drive member to the driven member, the power sensing device being arranged to detect a power transmitted to the driven member from the drive member.

5. The bicycle power sensing apparatus according to claim 4, further comprising
a rotation detecting device arranged to detect a rotational status between the driven member and the drive member.

6. A bicycle power sensing apparatus comprising:
a power sensing device;
a calibration signal generating device;
a controller operatively arranged to receive a calibration signal from the calibration signal generating device, the controller calibrating the power sensing device as being at a non-load level of zero power input upon receiving the calibration signal;
a rotation detecting device arranged to detect a rotational status between the driven member and the drive member;
a stationary member;
a drive member rotatably mounted relative to the stationary member;
a driven member rotatably mounted relative to the stationary member; and
a torque coupling member operatively arranged between the drive member and the driven member to selectively transmit torque from the drive member to the driven member, the power sensing device being arranged to detect a power transmitted to the driven member from the drive member,
the controller being operatively arranged to receive a rotational movement signal from the rotation detecting device and to receive an output signal from the power sensing device, the controller calibrating the power sensing device in response to the rotation detecting device detecting relative rotation between the drive member and the driven member.

7. The bicycle power sensing apparatus according to claim 1, wherein
the calibration signal generating device directly or indirectly detects a relative rotational status between a rear sprocket and a rear hub.

8. A bicycle power sensing apparatus comprising:
a power sensing device;
a calibration signal generating device;
a controller operatively arranged to receive a calibration signal from the calibration signal generating device, the controller calibrating the power sensing device as being at a non-load level of zero power input upon receiving the calibration signal;
a rotation detecting device arranged to detect a rotational status between the driven member and the drive member;
a stationary member;
a drive member rotatably mounted relative to the stationary member;
a driven member rotatably mounted relative to the stationary member; and
a torque coupling member operatively arranged between the drive member and the driven member to selectively transmit torque from the drive member to the driven member, the power sensing device being arranged to detect a power transmitted to the driven member from the drive member,
the controller records a signal level of an output signal from the power sensing device as the non-load level in response to the rotation detecting device detecting relative rotation between the drive member and the driven member.

9. The bicycle power sensing apparatus according to claim 5, wherein
the controller executes a calibration process to calibrate the power sensing device upon an occurrence of at least one of: (i) a startup operation of the bicycle power sensing apparatus, (ii) a set up operation of a battery coupled to the controller, and (iii) an input operation of an input device operatively connected to the controller, in response to the rotation detecting device detecting relative rotation between the drive member and the driven member.

10. The bicycle power sensing apparatus according to claim 9, wherein
the controller checks the rotational movement signal from the rotation detecting device after a prescribed period of time elapsed upon the controller determining no relative rotation between the drive member and the driven member.

11. The bicycle power sensing apparatus according to claim 1, wherein
the controller includes a communication unit operatively connected to the power sensing device to receive an output signal from the power sensing device and to output information based on the output signal from the power sensing device.

12. The bicycle power sensing apparatus according to claim 11, wherein
the communication unit wirelessly transmits the information.

13. The bicycle power sensing apparatus according to claim 5, wherein the rotation detecting device includes at least one magnet disposed on one of the drive member and the driven member, and the rotation detecting device includes a sensor disposed on the other of the drive member and the driven member.

14. The bicycle power sensing apparatus according to claim 5, wherein the rotation detecting device includes at least one magnet disposed on a sprocket attached to one of the drive member and the driven member, and the rotation detecting device includes a sensor disposed on the other of the drive member and the driven member.

15. The bicycle power sensing apparatus according to claim 4, wherein the power sensing device includes a strain sensor disposed on a part of the torque coupling member.

16. The bicycle power sensing apparatus according to claim 1, wherein the power sensing device includes at least one of a coil sensor, a capacitor sensor and an optical sensor.

17. The bicycle power sensing apparatus according to claim 1, further comprising a battery electrically coupled to the controller to supply electrical energy to the controller.

18. The bicycle power sensing apparatus according to claim 1, further comprising a dynamo electrically coupled to the controller to supply electrical energy to the controller.

19. A bicycle power sensing apparatus comprising:

a power sensing device;

a calibration signal generating device;

a controller operatively arranged to receive a calibration signal from the calibration signal generating device, the controller calibrating the power sensing device as being at a non-load level of zero power input upon receiving the calibration signal;

a rotation detecting device arranged to detect a rotational status between the driven member and the drive member;

a stationary member;

a drive member rotatably mounted relative to the stationary member;

a driven member rotatably mounted relative to the stationary member; and a torque coupling member operatively arranged between the drive member and the driven member to selectively transmit torque from the drive member to the driven member, the power sensing device being arranged to detect a power transmitted to the driven member from the drive member, the controller being operatively arranged to receive a rotational movement signal from the rotation detecting device and to receive an output signal from the power sensing device, the controller refraining from calibrating the power sensing device in response to the rotation detecting device detecting no relative rotation between the drive member and the driven member.

* * * * *